United States Patent
Larson et al.

(10) Patent No.: US 9,158,554 B2
(45) Date of Patent: *Oct. 13, 2015

(54) SYSTEM AND METHOD FOR EXPEDITING VIRTUAL I/O SERVER (VIOS) BOOT TIME IN A VIRTUAL COMPUTING ENVIRONMENT

(71) Applicant: International Business Machines Corporation, Armonk, NY (US)

(72) Inventors: Chad J. Larson, Austin, TX (US); Manjunath B. Muttur, Bangalore (IN); Daniel G. Thornton, Hutto, TX (US); Deepti S. Umarani, Belgaum (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 29 days.

This patent is subject to a terminal disclaimer.

(21) Appl. No.: 14/150,185

(22) Filed: Jan. 8, 2014

(65) Prior Publication Data

US 2014/0304703 A1 Oct. 9, 2014

Related U.S. Application Data

(63) Continuation of application No. 13/859,022, filed on Apr. 9, 2013.

(51) Int. Cl.
*G06F 9/44* (2006.01)
*G06F 9/45* (2006.01)
*G06F 9/50* (2006.01)
*G06F 9/455* (2006.01)

(52) U.S. Cl.
CPC .......... *G06F 9/4416* (2013.01); *G06F 9/45533* (2013.01); *G06F 9/45558* (2013.01); *G06F 9/5077* (2013.01); *G06F 2009/45579* (2013.01); *G06F 2209/501* (2013.01)

(58) Field of Classification Search
CPC .............. G06F 9/4416; G06F 9/45558; G06F 9/45533; G06F 9/5077
See application file for complete search history.

(56) References Cited

U.S. PATENT DOCUMENTS

| | | | |
|---|---|---|---|
| 7,266,823 B2 | 9/2007 | Alford, Jr. | |
| 7,472,246 B2 | 12/2008 | Hamilton, II et al. | |
| 7,779,413 B2 | 8/2010 | Suzuki | |
| 7,784,053 B2 | 8/2010 | Casey et al. | |

(Continued)

FOREIGN PATENT DOCUMENTS

| | | | |
|---|---|---|---|
| JP | 2010231601 A | 10/2010 | |
| JP | 2012221273 A | 11/2012 | |

*Primary Examiner* — Stefan Stoynov
(74) *Attorney, Agent, or Firm* — Parashos Kalaitzis; Arnold B. Bangali

(57) ABSTRACT

An approach for management of boot time of a virtual machine is provided. In one aspect, a system boot time application identifies assigned resources of a virtual I/O server (VIOS) of a computing system. In addition, the system boot time application allocates additional resources from client logical partitions (LPARs) of the computing system to the assigned resources of VIOS during boot time of VIOS. The system boot time application further identifies cores of the computing system during the boot time of VIOS. The system boot time application also sets the cores in turbo core mode until boot time of VIOS is completed. In one aspect, the system boot time application reallocates the allocated additional resources from VIOS to the client LPARs once boot time of VIOS is completed.

7 Claims, 4 Drawing Sheets

(56) References Cited

U.S. PATENT DOCUMENTS

| | | |
|---|---|---|
| 7,784,054 B2 | 8/2010 | Monasterio |
| 7,793,288 B2 | 9/2010 | Sameske |
| 8,046,764 B2 | 10/2011 | Yamakabe et al. |
| 8,112,749 B2 | 2/2012 | Jelinek et al. |
| 8,214,837 B2 | 7/2012 | Fish |
| 2002/0049897 A1 | 4/2002 | Sekiguchi et al. |
| 2005/0108717 A1 | 5/2005 | Hong et al. |
| 2007/0220246 A1* | 9/2007 | Powell et al. ............ 713/2 |
| 2009/0094612 A1 | 4/2009 | Hamilton, II et al. |
| 2011/0213886 A1* | 9/2011 | Kelkar et al. ............ 709/226 |
| 2013/0086583 A1* | 4/2013 | Uemura et al. ............ 718/1 |
| 2014/0304495 A1 | 10/2014 | Larson et al. |

\* cited by examiner

SYSTEM AND METHOD FOR EXPEDITING VIRTUAL I/O SERVER (VIOS) BOOT TIME IN A VIRTUAL COMPUTING ENVIRONMENT

CROSS REFERENCE TO RELATED APPLICATION

This application is a continuation of U.S. patent application Ser. No. 13/859,022 filed Apr. 9, 2013 the entire content and disclosure of which is incorporated herein by reference.

FIELD OF THE INVENTION

The present invention relates generally to management of boot time or boot process of computing systems, and more particularly to management of boot time of virtual I/O server (VIOS) in a virtual computing environment based on allocation of computing resources to the VIOS of the virtual computing environment.

BACKGROUND

In system virtualization, multiple virtual computing systems are created within a single physical computing system. The physical system can be a stand-alone computer, or alternatively, a computing system utilizing clustered computers and components. Virtual systems are independent operating environments that use virtual resources made up of logical divisions of physical resources such as processors, memory, and input/output (I/O) adapters. System virtualization is implemented through some managing functionality, typically hypervisor technology. Hypervisors, also called virtual machine managers (VMMs), use a thin layer of code in software or firmware to achieve fine-grained, dynamic resource sharing. Hypervisors are the primary technology for system virtualization because they provide the greatest level of flexibility in how virtual resources are defined and managed.

Hypervisors also provide the ability to divide physical computing system resources into isolated logical partitions. Each logical partition operates like an independent computing system running its own operating system (e.g., a virtual system). Operating systems running in a virtualized environment are often referred to as "guest machines." Exemplary operating systems include AIX®, IBM® i, Linux®, and the virtual I/O server (VIOS). Hypervisors can allocate dedicated processors, I/O adapters, and memory to each logical partition and can also allocate shared processors to each logical partition. Unbeknownst to the logical partitions, the hypervisor creates a shared processor pool from which the hypervisor allocates virtual processors to the logical partitions as needed. In other words, the hypervisor creates virtual processors from physical processors so that logical partitions can share the physical processors while running independent operating environments. The hypervisor can also dynamically allocate and de-allocate dedicated or shared resources (such as processors, I/O, and memory) across logical partitions while the partitions are actively in use. This is known as dynamic logical partitioning or dynamic LPAR and allows the hypervisor to dynamically redefine all available system resources to reach optimum capacity for each partition.

In addition to creating and managing the logical partitions, the hypervisor manages communication between the logical partitions via a virtual switch. To facilitate communication, each logical partition may have a virtual adapter for communication between the logical partitions, via the virtual switch. The type of the virtual adapter depends on the operating system used by the logical partition. Examples of virtual adapters include virtual Ethernet adapters, virtual Fibre Channel adapters, virtual Small Computer Serial Interface (SCSI) adapters, and virtual serial adapters. Virtual adapters are often implemented through a VIOS partition which manages the physical I/O adapters (SCSI disks, Fibre Channel disks, Ethernet, or CD/DVD optical devices). The other logical partitions may be considered "clients" or virtual I/O clients (VIOCs) to the VIOS. The VIOS can provide virtualized network resources to the other logical partitions via a Shared Ethernet adapter (SEA). The SEA bridges a physical Ethernet adapter with the respective virtual adapters and may apportion network bandwidth.

Furthermore, virtualized computing systems having VIOS and client LPARs can be required to allow the VIOS to boot completely before the computing system can boot other clients, including for example, LPAR clients. This is because VIOS provides storage and networking capability or services to clients of the computing system, and thus the computing system depends on a complete system boot of VIOS in order to operate. The requirement for VIOS to boot first, forces other clients of the computing system to operate in busy mode or state until system boot of VIOS is complete. In particular, the boot wait time of VIOS is significant when considering the large amount of I/O resources that are allocated by VIOS, since boot time includes initialization of all hardware resources or devices that wait for health check, device drivers to be loaded, waiting for input/output ("I/O") ports etc. This problem is particularly important in a MAX LPAR client environment in which processor and memory allocation to VIOS partition is minimized in order to maximize the number of LPAR client in the computer system. For example, A Max LPAR client system having 0.1 processor and 1 GB of memory, typically takes about 10-15 minutes for VIOS to boot completely before one can start booting the client LPAR client. Furthermore, since the LPAR client operates critical applications, the longer the wait time or downtime, the higher the loss of productivity of the computing system. Therefore, there exists a need to minimize the boot time of computing systems.

SUMMARY

In one embodiment, a method is provided for management of boot time in a virtual machine. The method comprises a computer system identifying assigned resources of a virtual I/O server (VIOS) of a machine. The method further comprises the computer system allocating additional resources from logical partitions LPAR of the machine to the assigned resources of VIOS during boot time of VIOS. The method further comprises the computer system identifying cores of the machine during the boot time of VIOS. The method further comprises the computer system setting the cores in turbo core mode until boot time of VIOS is completed. The method further comprises the computer system reallocating the allocated additional resources from VIOS to LPAR once boot time of VIOS is completed.

In another embodiment, a computer system is provided for management of boot time in a virtual machine. The computer system comprises one or more processors, one or more computer-readable memories, one or more computer-readable tangible storage devices and program instructions which are stored on at least one of the one or more storage devices for execution by at least one of the one or more processors via at least one of the one or more memories. The computer system further comprises program instructions program instructions to identify assigned resources of a virtual I/O server (VIOS) of a machine. The computer system further comprises program instructions to allocate additional resources from logical partitions LPAR of the machine to the assigned resources of VIOS during boot time of VIOS. The computer system further comprises program instructions to identify cores of the machine during the boot time of VIOS. The computer system further comprises program instructions to set the cores in turbo core mode until boot time of VIOS is completed. The computer system further comprises program instructions to reallocate the allocated additional resources from VIOS to LPAR once boot time of VIOS is completed.

In yet another embodiment, a computer program product is provided for management of boot time in a virtual machine is provided. The computer program product comprises one or more processors, one or more computer-readable memories, one or more computer-readable tangible storage devices and program instructions which are stored on at least one of the one or more storage devices for execution by at least one of the one or more processors via at least one of the one or more memories. The computer program product further comprises program instructions to identify assigned resources of a virtual I/O server (VIOS) of a machine. The computer program product further comprises program instructions to allocate additional resources from logical partitions LPAR of the machine to the assigned resources of VIOS during boot time of VIOS. The computer program product further comprises program instructions to identify cores of the machine during the boot time of VIOS. The computer program product further comprises program instructions to set the cores in turbo core mode until boot time of VIOS is completed. The computer program product further comprises program instructions to reallocate the allocated additional resources from VIOS to LPAR once boot time of VIOS is completed.

BRIEF DESCRIPTION OF THE SEVERAL VIEWS OF THE DRAWINGS

Novel characteristics of the invention are set forth in the appended claims. The invention itself, however, as well as preferred mode of use, further objectives, and advantages thereof, will be best understood by reference to the following detailed description of the invention when read in conjunction with the accompanying Figures, wherein like reference numerals indicate like components, and:

DETAILED DESCRIPTION

Embodiments of the present invention comprise functionality for expediting boot time of virtual I/O server (VIOS) of a computing device by allocating additional computing resources from client logical partitions (LPARs) to VIOS of the computing device, during boot time of VIOS. In one aspect, boot time or boot process is the initial set of operations that the computing device performs when electrical power to the computing device is switched on.

Furthermore, the boot process begins when the computing device is turned on for the first time or is re-energized after being turned off, and ends when the computing device is ready to perform its normal operations. For example, in most computing devices or systems having VIOS and client LPARs, the VIOS has to initially complete boot process of the computing device, before other clients of the computing device performs the boot time or boot process. In particular, embodiments of the present invention provide circuits or subassemblies of circuits as well as methods of operations that are performed to identify via a system boot time application, assigned computing resources of VIOS of the computing device, including, for example, physical and virtual adapters of VIOS. The system boot time application further allocates additional computing resources from client LPARs to the assigned computing resources of VIOS during boot time of VIOS. Furthermore, computing cores of the computing device are also set to turbo mode until the boot process of VIOS is complete. The system boot time application further reallocates the allocated additional resources from VIOS back to the client LPARs once the boot process of VIOS is complete, in accordance with the present invention.

Figure 1:
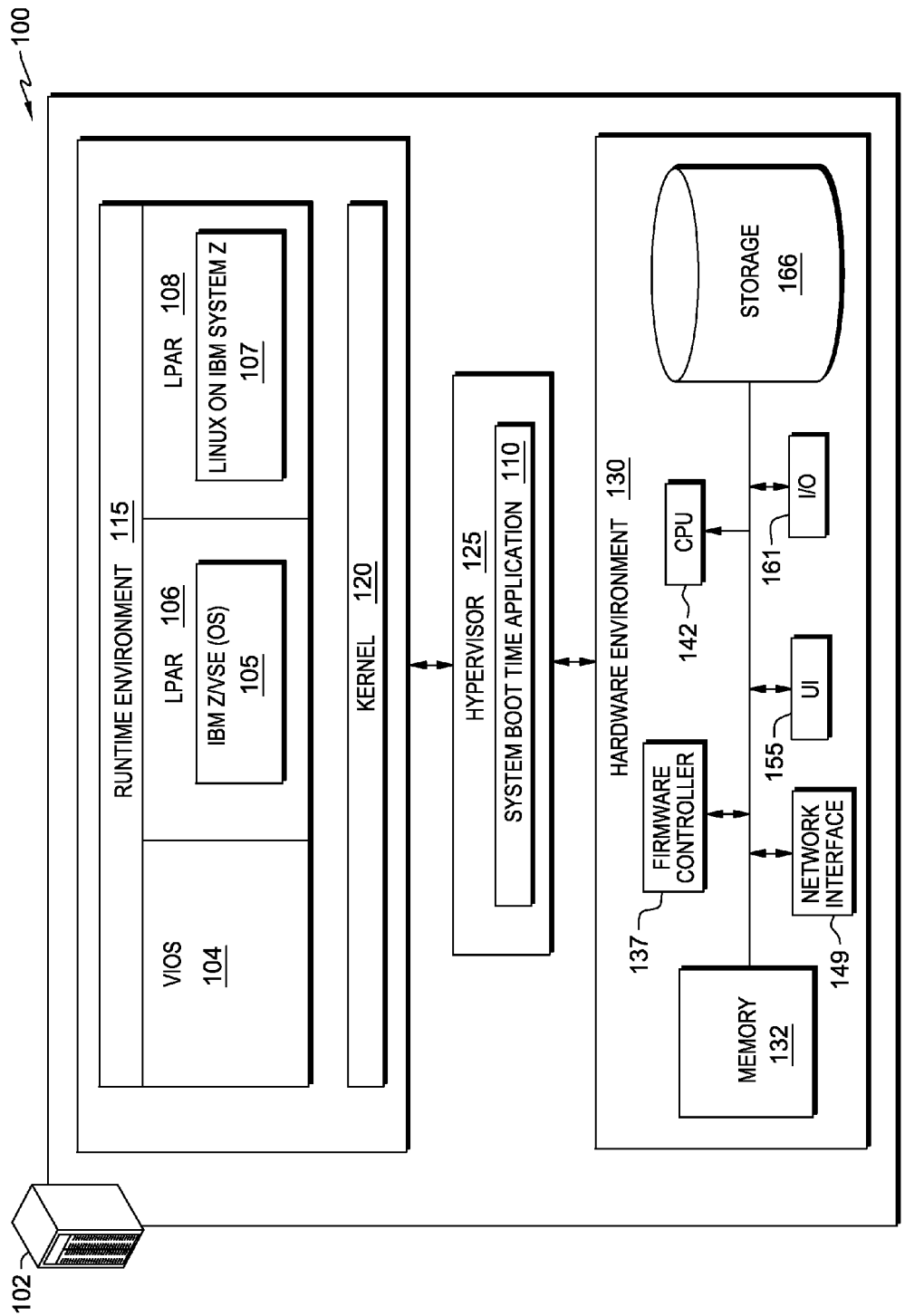
FIG. 1 is a block diagram of a virtual computing environment, in accordance with an embodiment of the present invention.

Embodiments of the present invention will now be described in detail with reference to the accompanying Figures. Referring now to FIG. 1, virtual computing environment 100 for expediting virtual I/O server (VIOS) boot time in a computing system by temporarily allocating additional computing resources from dependent client logical partitions (LPARs) is shown. In one embodiment, virtual computing environment 100 can be a stand-alone computer, or alternatively, a computing system utilizing a cluster of computers. Multiple virtual systems can be created within virtual computing environment 100.

Virtual computing environment 100 can also be an independent operating environment that utilizes virtual resources of a computing system. The virtual resources can include logical divisions of physical resources, such as processors, memory and input/output adapters. For example, virtual computing environment 100 can allow multiple types of operating systems to run within virtual machines on a single server, and also share the physical resources of the server. Virtual computing environment 100 comprises computing device 102.

Computing device 102 can be, for example, a laptop, tablet, or notebook personal computer (PC), a desktop computer, a mainframe or mini computer, a personal digital assistant (PDA), or a smart phone such as a Blackberry® (Blackberry is a registered trademark of Research in Motion Limited (RIM) Inc., in the United States, other countries, or both) or iPhone® (iPhone is a registered trademark of Apple Inc., in the United States, other countries, or both), respectively. In another aspect, computing device 102 can also be, for example, a server computing system such as a management server, a web server, or any other electronic device or computing system capable of receiving and sending data. The server computing system can participate in a "cloud" of computers interconnected by one or more networks, wherein the server computing system can be a primary server for a computing system utilizing clustered computers when accessed through virtual computing environment 100. Computing device 102 comprises runtime environment 115, hypervisor 125, and hardware environment 130.

According to aspects of the present invention, VIOS 104 of computing device 102 boots completely in virtual computing environment 100 before booting process of other clients of computing device 102, including for example, LPARs 106 and 108 of computing device 102 is performed. In one aspect, this is because the VIOS 104 of computing device 102 provides storage and networking capability or services to clients of computing device 102, and thus computing device 102 depends on a complete system boot of VIOS 104 in order to operate. In one example, the requirement for VIOS 104 to boot first, forces other clients of computing device 102 to operate in busy mode or state until system boot process of VIOS 104 is complete.

Hypervisor 125 performs hypervisor functions to manage communications between hardware environment 130 and runtime environment 115. Hypervisor 125 includes system boot time application 110. System boot time application 110 executes program applications in an operating environment of hypervisor 125, wherein system boot time application 110 assigns additional computing resources to existing or assigned computing resources of VIOS 104, during boot time of VIOS 104.

In one embodiment, the additional resources are allocated from LPARs 106 and 108 of computing device 102. Furthermore, system boot time application 110 performs functions to put cores of the allocated additional computing resources in turbo core mode until VIOS 104 boot process is complete. In yet another embodiment, system boot time application 110 reallocates the allocated additional computing resources from VIOS 104, back to LPARs 106 and 108, and restores the original settings of the cores, once boot time of VIOS 104 is complete, in accordance with embodiments of the present invention.

Runtime environment 115 supports execution of program applications that are executed within computing device 102. In one embodiment, runtime environment 115 supports addition of computing recourses from LPARs 106 and 108 of runtime environment 115 to VIOS 104 via program operation of system boot time application 110.

In particular, runtime environment 115 can be separated into partitions of computing device 102, including, for example, VIOS 104 and LPAR 106 and LPAR 108. In one embodiment, each of the LPARs 106 and 108 operates like an independent operating system executing its own operating environment (i.e., virtual machine) to facilitate allocation of additional computing resources to VIOS 104, during boot time of VIOS 104.

In one example, LPARs 106 and 108 can also provide management of computing resources of computing device 102 by allowing system boot time application 110 to allocate computing resources from the one or more of LPARs 106 and 108 to VIOS 104. For instance, LPARs 106 and 108 can be subsets of hardware environment 130. Furthermore, LPARs 106 and 108 execute an independent operating environment, such as, an operating system (OS) to execute program instructions to allocation additional computing resources to VIOS 104.

For example, LPAR 106 executes OS 105. OS 105 can be the IBM® z/VSE® (Virtual Storage Extended). LPAR 108 executes OS 107. OS 107 can be the Linux® on System Z® computing system. Other operating environments and combinations of operating environments may be utilized. Furthermore, any number of partitions can be created, and may exist on separate physical computers of a clustered computer systems operating within virtual computing environment 100 to manage allocation and reallocation of additional computing resources to VIOS 104 during boot time of VIOS 104.

The OS 105 of LPARs 106 and 108 can operate to provide a software platform on which application programs can be executed. Furthermore, the OS 105 manages access to storage resources of hardware environment 130, computational resources, and also rendering resources of computing device 102. In addition, the OS 105 can also provide memory management of computing device 102, allow computing device 102 to install, and execute multiple applications and processes corresponding to the applications that are executed within the OS, and operate as a virtual machine domain that manages virtual computing environment when virtual computing environment is booted to execute program instructions, according to one embodiment of the present invention.

Hardware environment 130 includes memory 132, network interface 149, firmware controller 137, user interface (UI) 155, I/O 161, CPU 142 and storage 166. Memory 132 may comprise, for example, one or more computer-readable storage media, which may include random-access memory (RAM) such as various forms of dynamic RAM (DRAM), e.g., DDR2 SDRAM, or static RAM (SRAM), flash memory, or any other form of fixed or removable storage medium that can be used to carry or store desired program code and program data in the form of instructions or data structures and that can be accessed by other components of computing device 102. In some embodiments, memory 132 provides a physical address space composed of addressable memory locations for one or more program applications that operate to execute program instructions in system boot time application 110. Network interface 149 is adapted to transmit or receive communication over a network coupled to computing device 102. Firmware controller 137 operates to internally control the circuits and subassemblies of computing device 102. UI 155 comprises a peripheral to enable interaction between a system administrator or user and computing device 102.

CPU 142 executes program instructions loaded into memory 132 from storage 166 in order to support execution of program applications in system boot time application 110. CPU 142 may further comprise one or more processors such as a digital signal processor (DSP), an application specific integrated circuit (ASIC), a field programmable gate array (FPGA), or any other equivalent logic device. Therefore, the terms "processor" or "controller," as used herein, may refer to any one or more of the foregoing structures or any structure suitable for implementation of embodiments of the present invention as described in more detail below. I/O 161 includes devices to process, propagate or display signals or data received or sent through circuits or subassemblies of circuits comprising computing device 102. Storage device 166 comprises non-transitory, computer-readable media, such as computer-readable storage media that includes volatile and/or non-volatile, removable and/or non removable media implemented in any method or technology for storage of information, such as, processor-readable instructions, data structures, program modules, or other data. Non-transitory, computer-readable media includes, but is not limited to, random access memory (RAM), read-only memory (ROM), EEPROM, FLASH memory or other optical storage, magnetic devices or any other medium that can be used to store the desired information and that can be accessed by other components of system boot time application 110.

Figure 2:
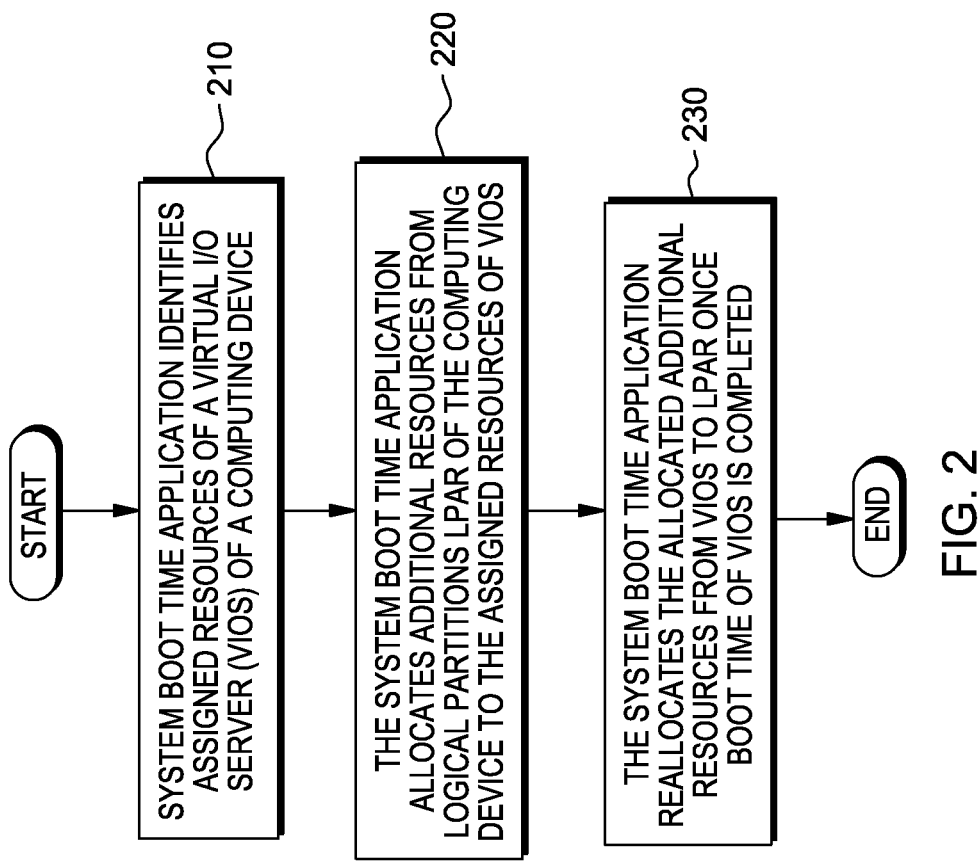
FIG. 2 is a flowchart depicting steps performed by a system boot time application to allocate and reallocate resources during boot time of a computing system in accordance with embodiments of the present invention.

FIG. 2 is a flowchart depicting steps performed by system boot time application 110 to allocate additional computing resources to VIOS 104 of FIG. 1, during boot time of VIOS 104, in accordance with embodiments of the present invention.

The boot time of VIOS 104 of computing device 102 is expedited by temporarily allocating additional computing resources from client LPARs 106 and 108 to VIOS 104, and the temporary allocation can be initiated when program operations of VIOS 104 are activated. In one embodiment, system boot time application 110 identifies physical and virtual resources assigned to VIOS 104. (Step 210). In VIOS 104, system boot time application 110 calculates the appropriate number of CPU and memory resources of computing device 102 that need to be assigned to VIOS 104 to expedite the boot process of VIOS 104. In this manner, system boot time application 110 allocates the additional resources from LPARs 106 and 108 to VIOS 104.

In one example, calculation of appropriate number of CPU and memory resources of computing device 102 can vary based on computing platforms and operating system of the computing platforms, including, for example, variations in processor or memory DIMMS of computing platforms of computing device 102, that operate at different processing speeds. In one aspect, assigning disproportionately less or disproportionately more computing resources during boot time of VIOS 104 can slow down the boot process of VIOS 104.

Furthermore, if disproportionately less resources are assigned to VIOS 104, the boot process or boot time of VIOS 104 will not adequately expedite boot time or boot process of VIOS 104 because the disproportionately less computing resources will take significantly less amount of time to complete initialization of computing resources of computing device 102. Therefore, according to at least one embodiment of the present invention, system boot time application 110 assigns a reasonable quantity of CPU and memory resources to VIOS 104 which will assist expediting boot time of VIOS 104. (Step 220). Once the boot process of VIOS 104 is completed, system boot time application 110 reallocates the allocated computing resources from VIOS 104 back to LPARs 106 and 108, hence, allowing VIOS 104 to operate with originally assigned computing resources. (Step 230).

Figure 3:
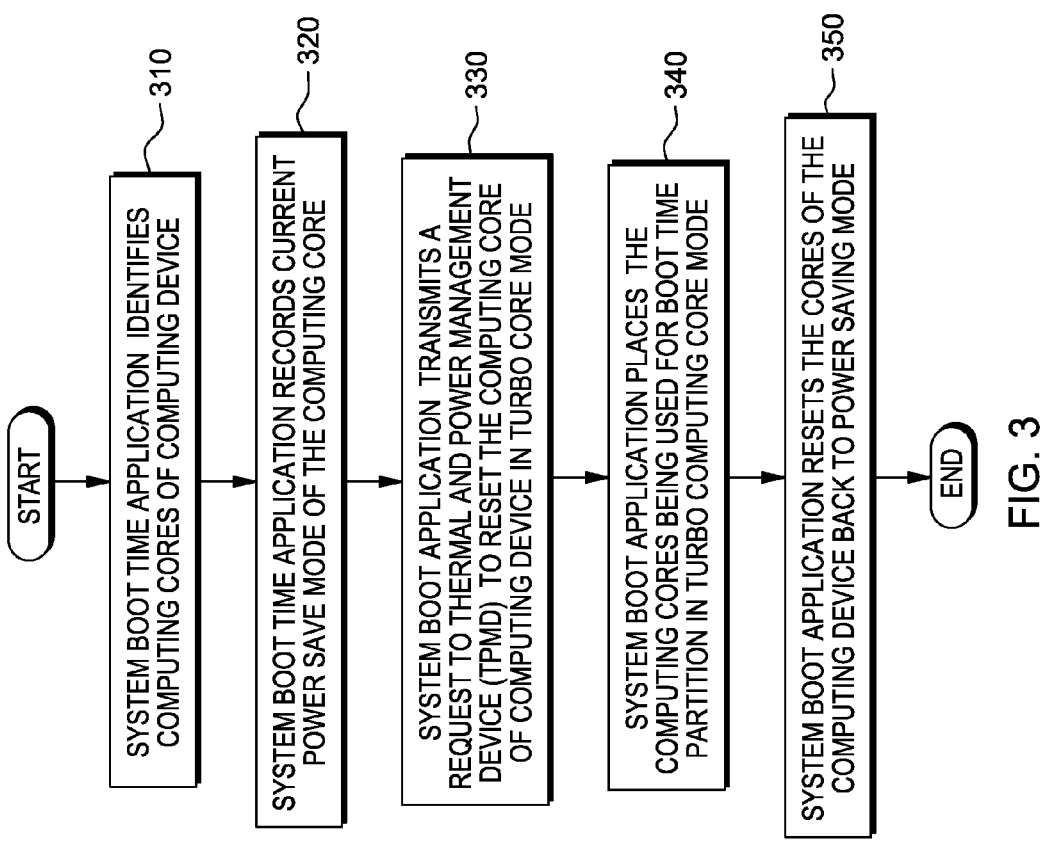
FIG. 3 is a flowchart depicting steps performed by a system boot time application to set cores of a computing system into turbo core mode during boot time of the computing system in accordance with embodiments of the present invention.

FIG. 3 is a flowchart depicting steps performed by system boot time application 110 for setting computing device 102 in turbo core mode during allocation of additional computing resources to VIOS 104 of FIG. 1, as described in FIG. 2, in accordance with embodiments of the present invention.

In one embodiment, system boot time application 110 identifies computing cores of computing device 102 that are assigned to VIOS 104 during boot time of VIOS 104 (Step 310). A turbo mode is specified for each computing core of computing device 102. In addition, system boot time application 110 records current power save mode of the computing core. (Step 320). According to one aspect, system boot time application 110 transmits a request to thermal and power management device (TPMD) of computing device 102 to reset the computing core of computing device in turbo core mode (Step 330).

The TPMD places the computing cores being used in turbo computing core mode. (Step 340). For example, TPMD is responsible for all energy functions in power series computing system, including, for example, IBM® power Series® (IBM and power series are registered trademarks of International Business Machines in the United States, other countries, or both) computing systems. Furthermore, once, the boot process of VIOS 104 is complete, system boot time application 100 TPMD resets of computing cores of computing device 102 back to power saving mode. (Step 350).

Figure 4:
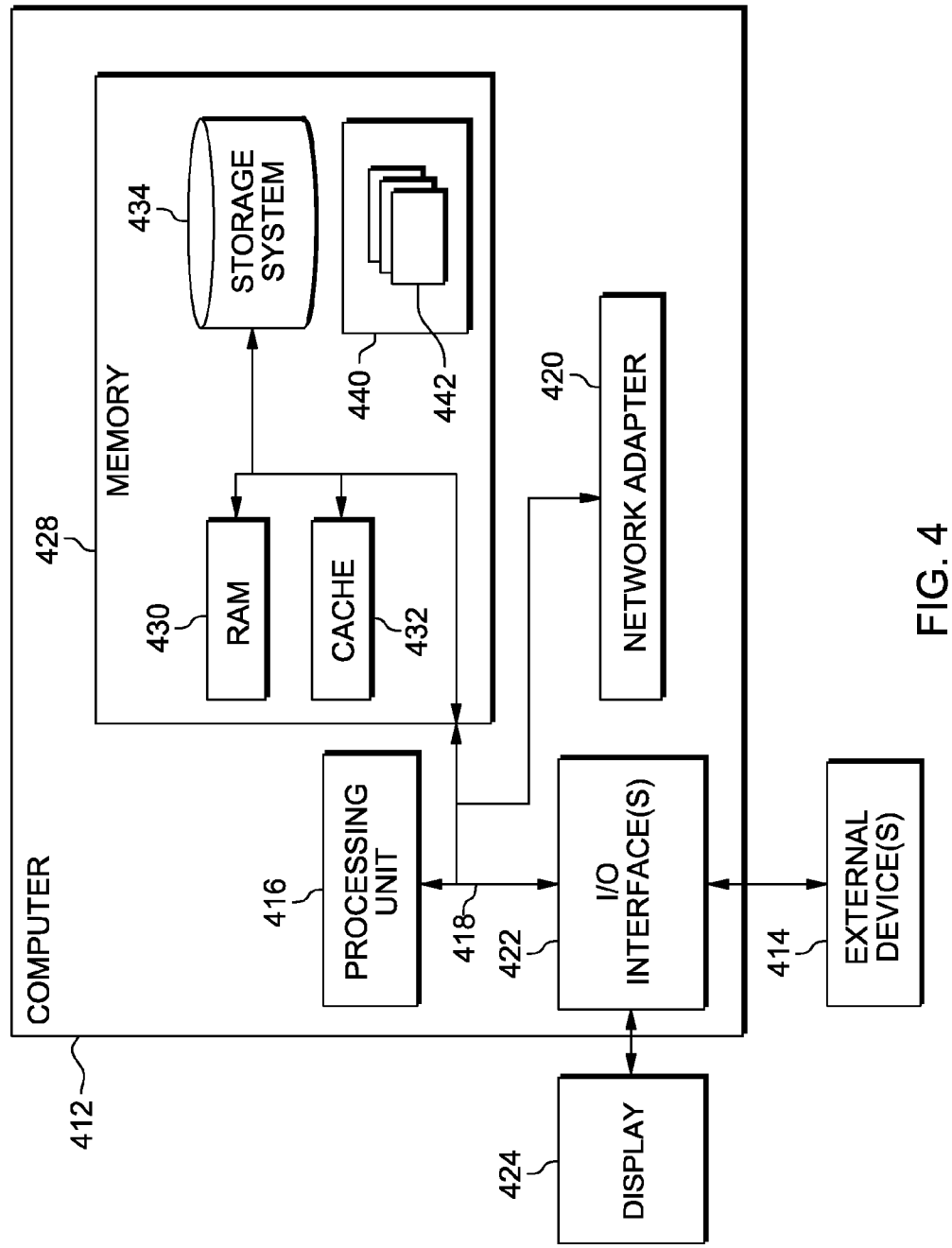
FIG. 4 illustrates a block diagram of components of computer system in accordance with embodiments of the present invention.

FIG. 4 is a block diagram of a computer system, in accordance with an embodiment of the present invention.

Computer system 400 is only one example of a suitable computer system and is not intended to suggest any limitation as to the scope of use or functionality of embodiments of the invention described herein. Regardless, computer system 400 is capable of being implemented and/or performing any of the functionality set forth hereinabove. In computer system 400 there is computer 412, which is operational with numerous other general purpose or special purpose computing system environments or configurations. Examples of well-known computing systems, environments, and/or configurations that may be suitable for use with computer 412 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computing device 102 can be implemented as an instance of computer 412.

Computer 412 may be described in the general context of computer system executable instructions, such as program modules, being executed by a computer system. Generally, program modules may include routines, programs, objects, components, logic, data structures, and so on that perform particular tasks or implement particular abstract data types. Computer 412 may be practiced in distributed cloud computing environments where tasks are performed by remote processing devices that are linked through a communications network. In a distributed cloud computing environment, program modules may be located in both local and remote computer system storage media including memory storage devices.

As further shown in FIG. 4, computer 412 is shown in the form of a general-purpose computing device. The components of computer 412 may include, but are not limited to, one or more processors or processing units 416, memory 428, and bus 418 that couples various system components including memory 428 to processing unit 416.

Bus 418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer 412 typically includes a variety of computer system readable media. Such media may be any available media that is accessible by computer 412, and includes both volatile and non-volatile media, and removable and non-removable media.

Memory 428 includes computer system readable media in the form of volatile memory, such as random access memory (RAM) 430 and/or cache 432. Computer 412 may further include other removable/non-removable, volatile/non-volatile computer system storage media. By way of example only, storage system 434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 418 by one or more data media interfaces. As will be further depicted and described below, memory 428 may include at least one program product having a set (e.g., at least one) of program modules that are configured to carry out the functions of embodiments of the invention.

System boot time application 110 can be stored in memory 428 by way of example, and not limitation, as well as an operating system, one or more application programs, other program modules, and program data. Each of the operating system, one or more application programs, other program modules, and program data or some combination thereof, may include an implementation of a virtual computing environment. Program modules 442 generally carry out the functions and/or methodologies of embodiments of the invention as described herein. System boot time application 110 can be implemented as an instance of program 440.

Computer 412 may also communicate with one or more external devices 414 such as a keyboard, a pointing device, etc., as well as display 424; one or more devices that enable a user to interact with computer 412; and/or any devices (e.g., network card, modem, etc.) that enable computer 412 to communicate with one or more other computing devices. Such communication occurs via Input/Output (I/O) interfaces 422. Still yet, computer 412 communicates with one or more networks such as a local area network (LAN), a general wide area network (WAN), and/or a public network (e.g., the Internet) via network adapter 420. As depicted, network adapter 420 communicates with the other components of computer 412 via bus 418. It should be understood that although not shown, other hardware and/or software components could be used in conjunction with computer 412. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustrations are implemented by special purpose hardware-based systems that perform the specified functions or acts, or combinations of special purpose hardware and computer instructions.

As will be appreciated by one skilled in the art, embodiments of the present invention may be embodied as a system, method or computer program product. Accordingly, embodiments of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the present invention may take the form of a computer program product embodied in one or more computer-readable medium(s) having computer-readable program code embodied thereon.

In addition, any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that contains, or stores a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that communicates, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing. Computer program code for carrying out operations for embodiments of the present invention may be written in any combination of one or more programming languages, including an object oriented programming language such as Java, Smalltalk, C++ or the like, conventional procedural programming languages such as the "C" programming language, a hardware description language such as Verilog, or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Based on the foregoing a method, system and computer program product for expediting boot time of VIOS of a computing device by allocating additional computing resources from client LPARs of the computing device during boot process of VIOS have been disclosed. However, numerous modifications and substitutions can be made without deviating from the scope of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. Therefore, the present invention has been disclosed by way of example and not limitation.

What is claimed is:

1. A method for management of boot time of a virtual machine, the method comprising the steps of:
    identifying assigned resources of a virtual I/O server (VIOS) of a machine;
    allocating additional resources from local partition (LPAR) of the machine to the assigned resources of VIOS during boot time of VIOS; and
    reallocating the allocated additional resources from VIOS to the local partition (LPAR) once boot time of VIOS is completed.

2. The method according to claim 1, wherein the step of identifying assigned resources of VIOS further comprises the steps of:
    determining an amount of assigned resources that need to be initialized during boot time of VIOS, and wherein the assigned resources include at least one of physical and virtual adaptors of VIOS of the machine; and
    identifying an appropriate amount of additional resources from the LPAR that needs to be allocated to the assigned resources of VIOS to expedite boot time of VIOS, wherein the additional resources includes components of processors or memory of the machine.

3. The method according to claim 2, wherein identification of an appropriate amount of additional resources is based on system configurations of the machine, including system utilization of hardware and software configurations of the machine.

4. The method according to claim 1, wherein VIOS is a partition of the machine, wherein the machine is a computing system utilizing clustered computers and components, and wherein the additional resources are allocated to booting partitions of VIOS.

5. The method according to claim 1, wherein boot time includes operations that are performed by VIOS when the machine is powered on.

6. The method according to claim 1, further comprising:
    identifying cores of the machine during boot time of VIOS;
    setting the cores in turbo core mode until boot time of VIOS is completed;
    recording current power state of the cores of the machine;
    transmitting a request to a power device of the machine to set the current power state of the cores in turbo core mode;
    setting the cores used for partitions of the machine in the turbo core mode during boot time of VIOS, wherein the cores are set in turbo mode by the power device; and
    resetting the cores to the current power state once boot time of VIOS is complete.

7. The method according to claim 6, wherein the power device is a power management device which is responsible energy scale functions of resources of the machine.

* * * * *